United States Patent
Kim et al.

(10) Patent No.: US 7,466,512 B2
(45) Date of Patent: Dec. 16, 2008

(54) ELECTRIC POWER SUPPLY DEVICE OF A TAPE-END DETECTING SENSOR FOR A TAPE RECORDER

(75) Inventors: Bong-joo Kim, Suwon (KR); Do-young Choi, Suwon (KR); Jae-kab Seo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 11/362,873

(22) Filed: Feb. 28, 2006

(65) Prior Publication Data

US 2006/0245107 A1 Nov. 2, 2006

Related U.S. Application Data

(62) Division of application No. 10/446,862, filed on May 29, 2003, now Pat. No. 7,038,879.

(30) Foreign Application Priority Data

Sep. 13, 2002 (KR) .............................. 2002-55817

(51) Int. Cl.
G11B 5/008 (2006.01)
G11B 33/12 (2006.01)
H01S 4/00 (2006.01)

(52) U.S. Cl. .................. 360/96.1; 29/592.1; 360/96.51; 72/379.2

(58) Field of Classification Search ............... 200/16 C, 200/16 D, 257, 258, 260, 261; 439/32; 360/84, 360/85, 96.1, 96.5, 96.51; 242/344, 338; 72/324, 379.2; 29/592.1
See application file for complete search history.

(56) References Cited

U.S. PATENT DOCUMENTS

| 2,845,501 | A |   | 7/1958 | George |
|---|---|---|---|---|
| 4,540,233 | A | * | 9/1985 | Saijo et al. ................... 439/834 |
| 4,617,609 | A | * | 10/1986 | Utner et al. .................. 361/310 |
| 4,952,762 | A |   | 8/1990 | Koyanagi |
| 5,529,517 | A | * | 6/1996 | Hopf et al. ................... 439/843 |

(Continued)

FOREIGN PATENT DOCUMENTS

DE 2359971 A1 6/1975

(Continued)

Primary Examiner—William J Klimowicz
(74) Attorney, Agent, or Firm—Roylance, Abrams, Berdo & Goodman, LLP

(57) ABSTRACT

A power supply device of a tape-end detecting sensor for a tape recorder. The power supply device comprises a reel cover disposed on a sub-chassis, with a tape-end detecting sensor being seated on the reel cover for detecting the passing of a terminal end of a magnetic portion of a magnetic tape, a first power transmitting member mounted in the reel cover to be connected to the detecting sensor and having a first contacting portion, and a second power transmitting member disposed on the sub-chassis and having a second contacting portion that comes into contact with the first contacting portion when the reel cover is mounted on the sub-chassis. The power supply device further comprises a resilient pressing member integrally formed with the sub-chassis, for resiliently pressing the second contacting portion toward the first contacting portion to improve a contacting force between the first and the second contacting portions.

5 Claims, 4 Drawing Sheets

U.S. PATENT DOCUMENTS

| | | | | |
|---|---|---|---|---|
| 5,573,434 | A | * | 11/1996 | Ittah et al. ............ 439/839 |
| 5,692,696 | A | | 12/1997 | Kobayashi |
| 5,871,379 | A | | 2/1999 | Tanaka et al. |
| 6,568,955 | B2 | * | 5/2003 | Hotea et al. ............ 439/495 |

FOREIGN PATENT DOCUMENTS

| | | | | |
|---|---|---|---|---|
| DE | 3739354 | A1 | * | 6/1989 |
| EP | 899818 | A2 | * | 3/1999 |
| FR | 2740266 | A1 | * | 4/1997 |
| GB | 2133921 | A | * | 8/1984 |
| JP | 48-18367 | | | 5/1973 |
| JP | 2873675 | | | 1/1999 |
| JP | 2000-12136 | | | 1/2000 |
| JP | 2002075555 | A | * | 3/2002 |

\* cited by examiner

ELECTRIC POWER SUPPLY DEVICE OF A TAPE-END DETECTING SENSOR FOR A TAPE RECORDER

This application is a division of U.S. patent application Ser. No. 10/446,862, filed May 29, 2003, now U.S. Pat. No. 7,038,879, which claims benefit under 35 U.S.C. §119 from Korean Patent Application No. 2002-55817, filed on Sep. 13, 2002, the entire content of which is incorporated herein by reference.

BACKGROUND OF THE INVENTION

1. Field of the Invention

The present invention relates to a tape recorder, and more particularly, to a power supply device that supplies power for a tape recorder to a tape-end detecting sensor capable of detecting the passing of a magnetic portion of a magnetic tape.

2. Description of the Related Art

A tape recorder having a deck mechanism, such as a video tape recorder (VTR), a digital audio tape (DAT), and a camcorder, is an apparatus that records and reproduces audio and video information from a magnetic tape running along a predetermined path.

FIG. 1 shows an example of the interior of a camcorder employing a moving deck 100. As shown in FIG. 1, the moving deck 100 of the recorder includes a main-chassis 110 and a sub-chassis 120 mounted on the main-chassis 110. The sub-chassis 120 reciprocally slides on the main-chassis 110 when a magnetic tape is loaded and unloaded.

A head drum 130, a capstan driving unit 160, and a loading motor 140 are disposed on the main-chassis 110. A magnetic tape running guiding device 150 is disposed on the sub-chassis 120. The magnetic tape running guiding device 150 includes a plurality of pole members 152 and a plurality of rollers 151, a pair of reel tables 170 on which a tape reel of the tape cassette (not shown) is seated with a tape cassette being loaded, and an idler assembly 180 for controlling a rotation driving force to be transmitted to the reel table 170. Also, the tape recorder includes a tape-end detecting sensor disposed at an upper portion of the sub-chassis 120, for detecting the passage of a leading portion of a magnetic tape, for example a transparent portion of the tape, after a magnetic portion of the magnetic tape passes the sensor.

The tape-end detecting sensor employs a light detecting method using a light-emitting element 190 such as an LED, and a light-receiving element (not shown). As shown in FIG. 1, the light-emitting element 190 is seated on a seating portion 191A of a reel cover 191 so that it is supported by an upper portion of the sub-chassis 120, and the light-receiving element is fixedly disposed at both inner walls of the deck 100. Also, the positions of the light-emitting element 190 and the light-receiving element may be switched according to the type of tape recorder in which they are employed. Also, there are various configurations of the sensor. For example, a detecting sensor including the light-emitting element 190 and the light-receiving element can be formed integrally with each other and seated on the reel cover 191.

The tape recorder further includes a power supply device for supplying power to the light-emitting element 190 disposed at the upper portion of the sub-chassis 120, or to the light-receiving element from a power source device (not shown) provided in the deck 100. The power supply device includes the reel cover 191, a first power transmitting member 193, a second power transmitting member 197, and a resilient pressing member 195.

The reel cover 191 is disposed on the sub-chassis 120 to cover the reel table 170 and the idler assembly 180, and is made of a metallic plate or formed by injection-molding of a synthetic resin material. In accordance with the trend toward a compact-sized tape recorder, the reel cover 191 has a complicated shape in order for the reel cover 191 to perform various functions in a narrow space of the deck 100. Accordingly, the reel cover 191 is preferably a plate made of synthetic resin material, because such a reel cover 191 can be shaped as desired with less restrictions than the metallic plate type. The first power transmitting member 193 is electrically connected to the light-emitting element 190 to be seated on the seating portion 191A of the reel cover 191, and has one end fixed to a lower surface of the reel cover 191. Generally, the first power transmitting member 193 uses a flexible printed circuit (FPC). The second power transmitting member 197 is disposed on an upper surface of the sub-chassis 120 and is electrically connected to the power supply device. At an end of the second power transmitting member 197 is disposed a second contacting portion 197A that comes into contact with a first contacting portion 193A of the first power transmitting member 193 when the reel cover 191 is mounted on the sub-chassis 120. The second power transmitting member 197 generally uses the FPC as the first power transmitting member 193.

After a long period of use, or during manufacture of the conventional power supply device of the tape-end detecting sensor employing the reel cover 191 made of synthetic resin, it is often the case that the reel cover 191 becomes inelastically deformed which causes the first contacting portion 193A to be separated from the second contacting portion 197A fixed to the one end of the second power transmitting member 197 on the sub-chassis 120. According to conventional methods to solve this problem, the reel cover 191 is instead made of metallic material, or an extra resilient pressing member 195 is required to resiliently press the first contacting portion 193A downward from the reel cover 191. When the resilient pressing member 195 is used, the reel cover 191 is mounted on the sub-chassis 120 in a manner as shown in FIG. 2.

However, the conventional tape recorder having the above-described construction has drawbacks such as increased manufacturing cost and an increased number of manufacturing processes due to the presence of the extra resilient pressing member 195.

SUMMARY OF THE INVENTION

The present invention has been developed in order to solve the above drawback and other problems associated with the conventional arrangement. An aspect of the present invention is to provide a power supply device of a tape-end detecting sensor for a tape recorder having an improved construction capable of supplying a power to the tape-end detecting sensor in a less expensive and simpler manner.

The above aspect is substantially achieved by providing a power supply device of a tape-end detecting sensor for a tape recorder according to an embodiment of the present invention. The power supply device comprises a reel cover disposed on a sub-chassis, with a tape-end detecting sensor being seated thereon for detecting the passing of a terminal end of a magnetic portion of a magnetic tape, a first power transmitting member mounted in the reel cover and having a first contacting portion connected to the detecting sensor, and a second power transmitting member disposed on the sub-chassis and having a second contacting portion that comes into contact with the first contacting portion when the reel cover is mounted on the sub-chassis. The power supply device further comprises a resilient pressing member integrally formed with the sub-chassis, for resiliently pressing the second contacting portion toward the first contacting portion to increase a contacting force between the first and the second contacting portions.

It is preferred that the resilient pressing member is formed integrally with the sub-chassis by cutting a part of the sub-chassis and bending-up the cut part.

Also, it is preferred that the resilient pressing member has a pressing protrusion protruding from a part thereof corresponding to a lower surface of the second contacting portion, with the pressing protrusion pressing the second contacting portion toward the first contacting portion when the reel cover is mounted on the sub-chassis.

Also, it is preferred that the pressing protrusion is formed by embossing a part of the resilient pressing member convexly toward the second contacting portion.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1:
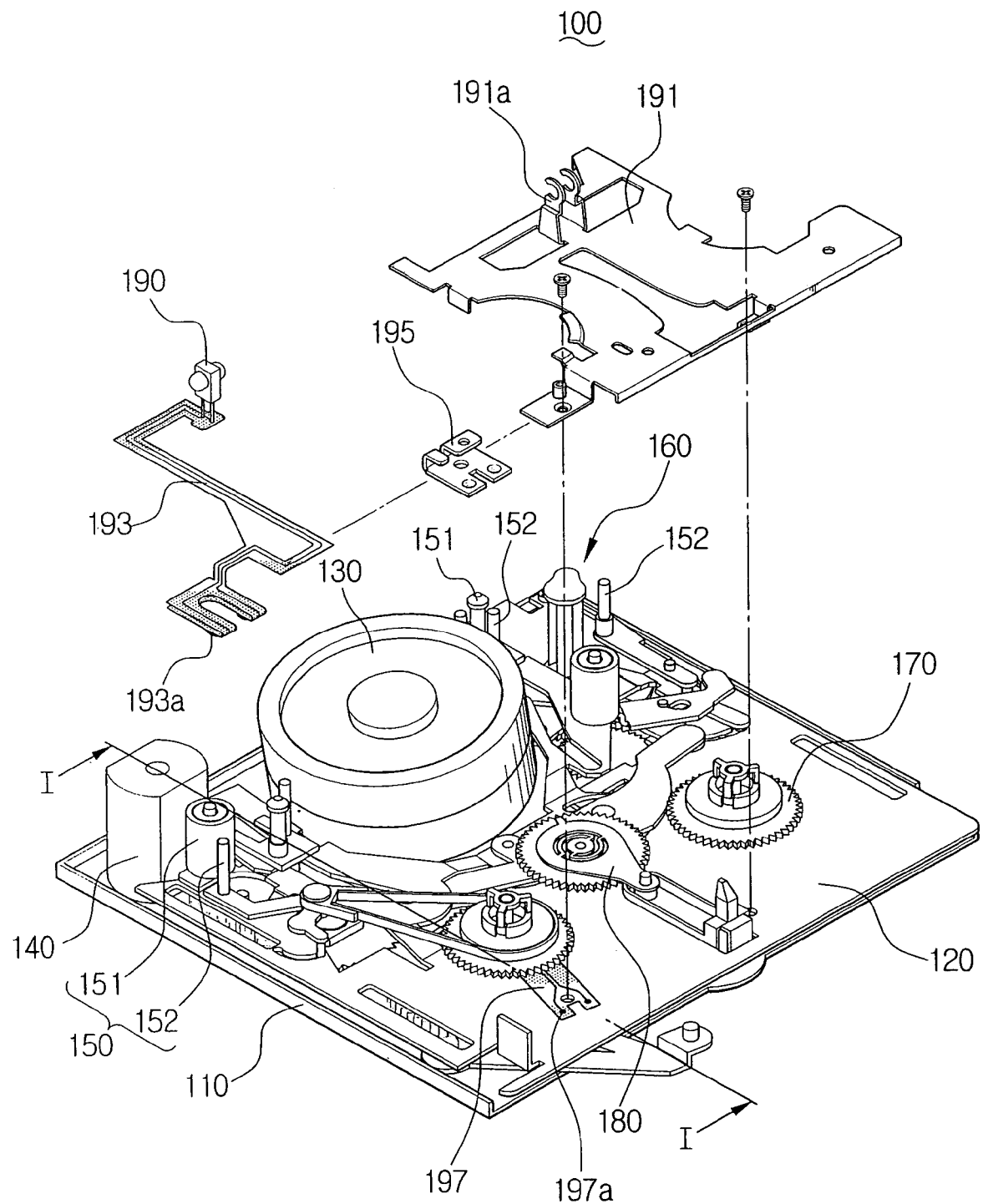
FIG. 1 is an exploded perspective view showing an interior of a moving deck of a conventional tape recorder.

Certain embodiments of the present invention will be described in greater detail with reference to the accompanying drawings. With respect to elements identical to those of the conventional tape recorder shown in FIGS. 1 and 2, like reference numerals are assigned, and a detailed description of those components is omitted for conciseness.

Figure 3:
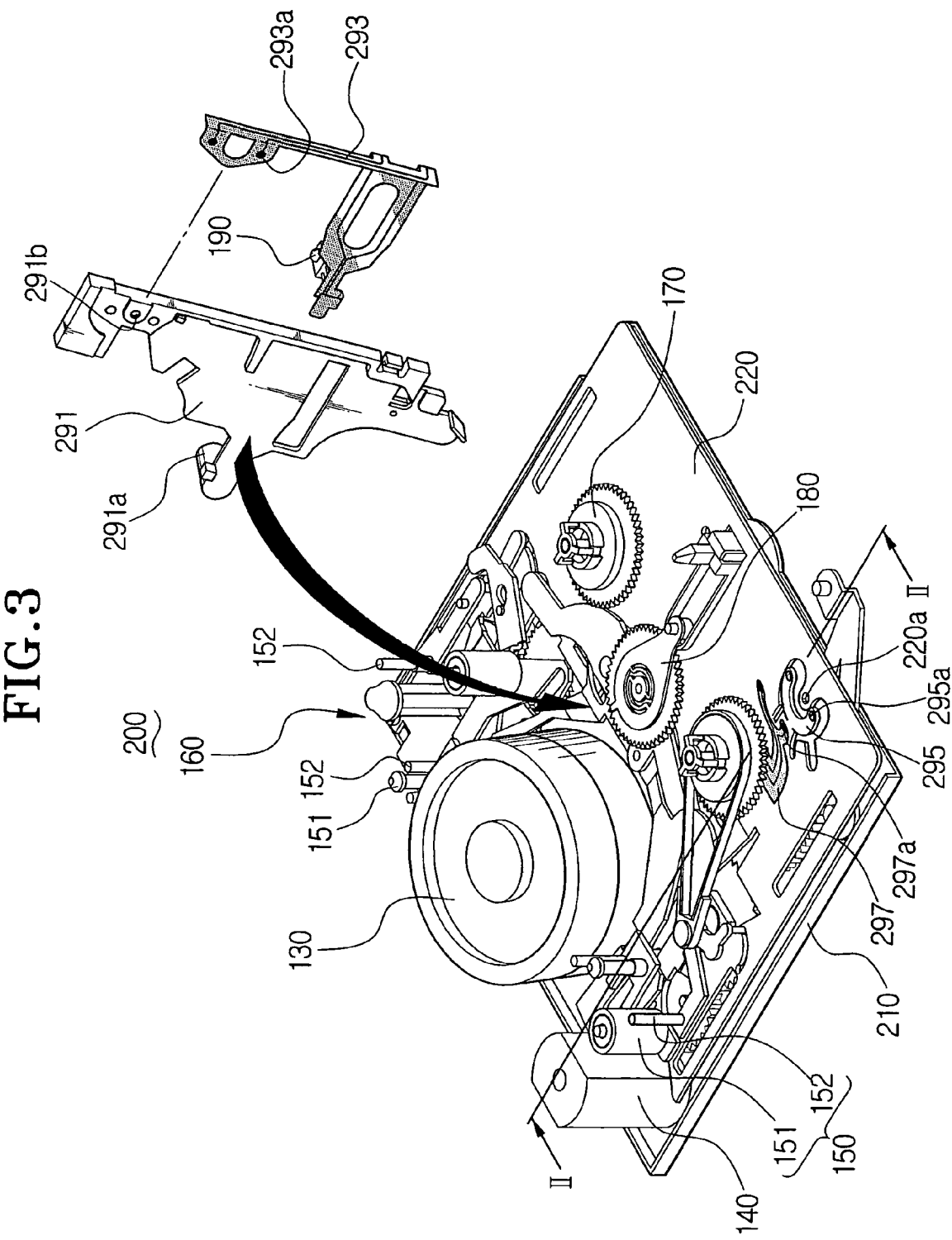
FIG. 3 is an exploded perspective view showing an interior of a moving deck of a tape recorder according to an embodiment of the present invention.
Figure 4:
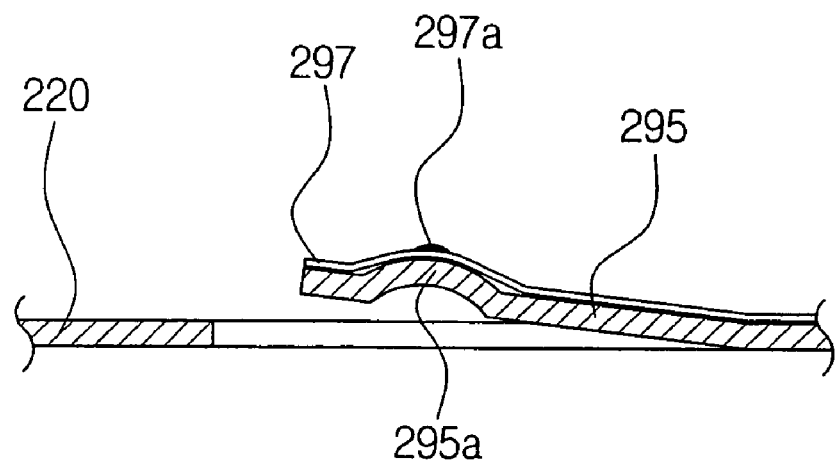
FIGS. 4 and 5 are cross-sectional views showing the reel cover mounted on the sub-chassis along line 11-H of FIG. 3.

Referring to FIGS. 3 and 4, a tape recorder according to an embodiment of the present invention employs a moving deck 200 including a main-chassis 210 and a sub-chassis 220. A power supply device of a tape-end detecting sensor includes a reel cover 291, a first power transmitting member 293, a second power transmitting member 297, and a resilient pressing member 295.

The reel cover 291 is disposed on the sub-chassis 220 to cover a reel table 170 and an idler assembly 180, and has a seating portion 291A formed on an upper surface thereof. In this embodiment, a light-emitting element 190 is seated on the seating portion 291A. However, in some cases, a light-receiving element (not shown) may also be seated on the seating portion 291A. In this case, the light-emitting element 190 is positioned to project a detecting light into the light-receiving members disposed at inner walls of the deck 200. Various modified embodiments also can be used. For example, the light-emitting element 190 can be integrally formed with the light-receiving member so that it is seated on the seating potion 291A together with the light receiving member.

The first power transmitting member 293 is disposed at the reel cover 291 and electrically connected to the light-emitting element 190. An end of the first power transmitting member 293 is fixed to a lower surface of one side of the reel cover 291. Around the end of the first power transmitting member 293 is formed a first contacting portion 293A. Any type of material can be used for the first power transmitting member 293, if the material could allow the light-emitting element 190 to be electrically connected to the first contacting portion 293A. For example, the first power transmitting member 293 can be a FPC that enables the first power transmitting member 293 to fix to a surface of the reel cover 291 using adhesive. The use of FPC can increase a product efficiency of the tape recorder.

The second power transmitting member 297, which is electrically connected to a power supply device (not shown) of the tape recorder, is fixed to the upper surface of the sub-chassis 220 and has a second contacting portion 297A that comes into contact with the first contacting portion 293A when the reel cover 291 is mounted on the sub-chassis 220. Accordingly, when the reel cover 291 is mounted on the sub-chassis 220, the first and the second contacting portions 293A and 297A come into contact with each other, thereby supplying a power of the tape recorder to the light-emitting element 190.

The resilient pressing member 295 is integrally formed with the sub-chassis 220 to resiliently press the second contacting portion 297A of the second power transmitting member 297 upwardly. In this example, the resilient pressing member 295 is formed by cutting a part of the sub-chassis 220 in a predetermined shape and bending up the cut part.

The resilient pressing member 295 of this embodiment has an end formed in a crescent shape, and the second contacting portion 297A of the second power transmitting member 297 is disposed at both ends of the resilient pressing member 295. Accordingly, even in the case that the space for the resilient pressing member 295 is limited due to the small-sized sub-chassis 220 for improving the compactness of the tape recorder and the presence of the reel table 170 in the sub-chassis 220, the resilient pressing member 295 has a resilience sufficient to press the second power transmitting member 297. As shown in FIGS. 3 and 4, by forming the end of the resilient pressing member 295 in a crescent shape, the resilient pressing member 295 has a longer length from a fixing end to a free end, i.e., to the end which contacts the second contacting portion 297A, than in the case where the end of the resilient pressing member 295 is formed in a bar shape. Accordingly, greater resilience is exerted to the end of the resilient pressing member 295 when the end is formed in the crescent shape.

It is also noted that reference numerals 220*a* and 291*b* indicate fastening holes, to which at least one screw (not shown) for combining the reel cover 291 with the sub-chassis 220 is fastened. The fastening holes 220*a* and 291*b* of this embodiment are interposed between both ends of the resilient pressing member 295. Since the force for combining the reel cover 291 and the sub-chassis 220 is concentrated in the place nearest to the first and the second contacting portions 293A and 297A between the reel cover 291 and the sub-chassis 220, contact at the first and the second contacting portions 293A and 297A can be maintained constant.

Since the resilient pressing member 295 can be fabricated simultaneously with the sub-chassis 220, the assembling process of the deck 200 does not require an extra process for forming the resilient pressing member 295. Although not shown, if a general deck is employed instead of the moving deck 200, a resilient pressing member is formed by cutting a part of the sub-chassis 220 and bending up the cut part so that it can perform the same function as the elastic pressing member 295 as described in this embodiment.

Figure 5:
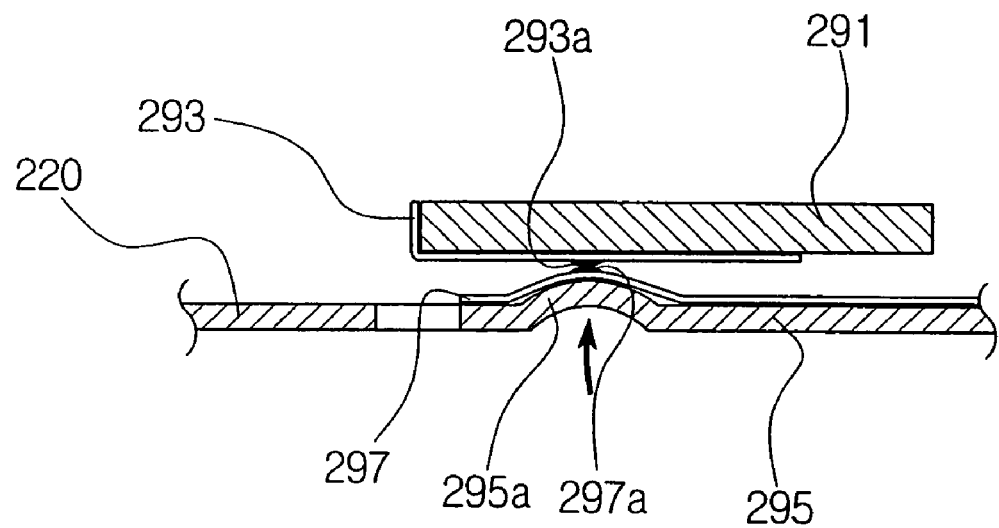

FIGS. 4 and 5 sequentially show shape deformations of the resilient pressing member 295 occurring when the reel cover 291 is mounted in the sub-chassis 220. Referring to FIGS. 4 and 5, the resilient pressing member 295 has a pressing protrusion 295A protruding from a part thereof corresponding to a lower portion of the second contacting portion 297A of an upper surface of the second power transmitting member 297. The pressing protrusion 295A is formed by embossing a part of the resilient pressing member 295 convexly and upwardly from the sub-chassis 220. Accordingly, the second contacting portion 297A protrudes upwardly more than the other part of the second power transmitting member 297 so that the first and the second contacting portions 293A and 297A easily contact each other.

The resilient pressing member 295 according to the embodiments of the present invention as described above can increase a contacting force between the first and the second contacting portions 293A and 297A. Also, instead of using a reel cover made of metallic material, a reel cover 291 made of synthetic resin can be used for maintaining the contacting force between the first and the second contacting portions 293A and 297A. Hence, the shape of the reel cover 291 need not be restricted as with a metallic reel cover. Accordingly, to satisfy the growing demand for the compact-sized tape recorder, the reel cover 291 can be fabricated in a complicated shape.

It should also be noted that the preferred embodiment of the present invention is not limited to the camcorder employing the moving deck 200, but rather, can be employed in other tape recorder devices having a deck mechanism, such as a vide tape recorder (VTR) and a digital audio tape (DAT).

Figure 2:
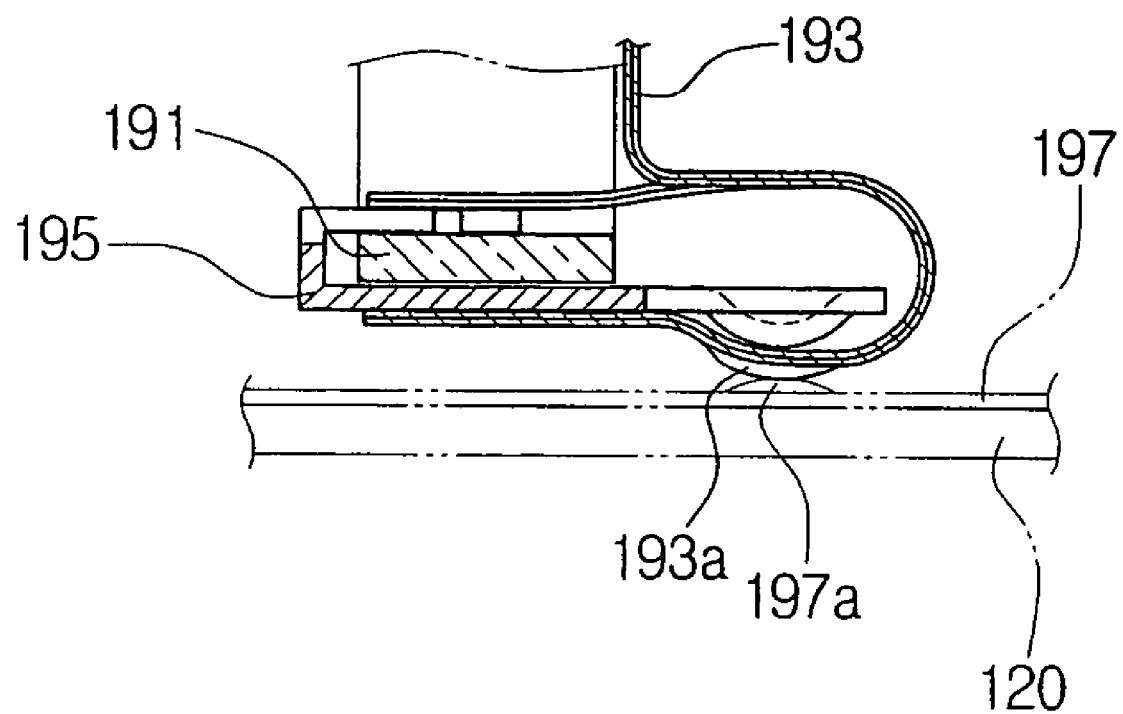
FIG. 2 is a cross-sectional view showing the reel cover mounted on the sub-chassis along a line of I-I.

According to the embodiments of the present invention described above, the use of the resilient pressing member 295 formed by cutting the part from the chassis of the tape recorder and bending up the part can increase and maintain the contacting force between the first and the second contacting portions 293a and 297a. Hence, the power can be applied to the tape-end detecting sensor in a stable manner without using a separate resilient pressing member 195 as shown in FIG. 1, and thus the embodiments of the present invention can be produces with a fewer number of manufacturing process and at a lower manufacturing cost.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of forming a resilient pressing member, adapted for use with a power supply device of a tape detecting sensor for a tape recorder including a sub-chassis, the method comprising:

cutting a portion of the sub-chassis to form a cut portion having a connected end, connected to the sub-chassis, and a free end, connected to the connected end, wherein the cutting includes shaping the free end in a crescent-shape;

bending the cut portion such that the cut portion is resiliently connected to the sub-chassis at the connected end; and providing a fastening hole for securing a reel cover and the sub-chassis at a point substantially concentric with an arc of the crescent-shape of the cut and bent portion of the sub-chassis.

2. A method of forming a resilient pressing member, adapted for use with a deck mechanism including a deck chassis, the method comprising:

cutting a portion of the deck chassis to form a cut portion having a connected end, connected to the deck chassis, and a free end, connected to the connected end, wherein the cutting includes shaping the free end in a crescent-shape;

bending the cut portion such that the cut portion is resiliently connected to the deck chassis at the connected end; and providing a fastening hole for securing a reel cover and the deck chassis at a point substantially concentric with an arc of the crescent-shape of the cut and bent portion of the deck chassis.

3. A method as claimed in claim 2, further comprising embossing a part of the cut portion convexly upward from the deck chassis.

4. A method of forming a resilient pressing member, adapted for use with a deck mechanism including a main chassis and a sub-chassis movable to load and unload with respect to the main chassis, the method comprising:

cutting a portion of the sub-chassis to form a cut portion having a connected end, connected to the sub-chassis, and a free end, connected to the connected end, wherein the cutting includes shaping the free end in a crescent-shape;

bending the cut portion such that the cut portion is resiliently connected to the sub-chassis at the connected end; and providing a fastening hole for securing a reel cover and the sub-chassis at a point substantially concentric with an arc of the crescent-shape of the cut and bent portion of the sub-chassis.

5. A method as claimed in claim 4 further comprising embossing a part of the cut portion convexly upward from the sub-chassis.

* * * * *